Dec. 30, 1969  W. WERNER  3,486,806
BINOCULAR PERISCOPE

Filed June 1, 1964  5 Sheets-Sheet 1

United States Patent Office 3,486,806
Patented Dec. 30, 1969

3,486,806
BINOCULAR PERISCOPE
Walter Werner, Konigsbronn, Wurttemberg, Germany, assignor to Carl Zeiss-Stiftung, doing business as Carl Zeiss, Wurttemberg, Germany, a corporation of Germany
Filed June 1, 1964, Ser No. 371,846
Claims priority, application Germany, May 31, 1963, Z 10,152
Int. Cl. G02b 23/08
U.S. Cl. 350—35
4 Claims The invention relates to a periscope, particularly for submarines, having a single objective and means which make a binocular observation possible. In known constructions of this type a partially reflecting beam splitting mirror is employed in such a manner that a portion of the entire amount of the light rays entering through the viewing prism is deflected from the path of the light rays and is directed by an additional eyepiece or ocular into the second eye of the observer. This type of binocular observation is, however, accompanied, as is well known, by absorption losses caused by the beam splitting plate.

It is an object of the invention to eliminate these losses in light intensity and this is accomplished in the following manner.

A periscope is employed which is provided in the space between its single objective and its two eyepieces or oculars with a zone of a parallel path of light rays in which is available an "intermediate pupil" (intermediate image of the entrance pupil of the periscope) having a relatively great diameter. Within this intermediate pupil there are arranged two reflector systems comprising, for example, two rhombohedral reflecting prisms by which the beam of light entering through the viewing prism is divided up into two separate equal partial beams of light rays which partial beams of light rays are directed to the separate eyepieces or oculars. This arrangement has practically no light absorption; the low reflection losses of the reflector system are negligible.

If for instance, the periscope is constructed with a 1.5-fold enlargement or magnification and has an exit pupil of about 7 mm. in diameter, the entrance pupil will have a diameter of about 10.5 mm. Accordingly a viewing prism having an aperture of 21 mm. diameter would accommodate two entrance pupils each having a diameter of 10.5 mm.

But, if the enlargement is increased by means of an enlargement changer, for example, by a slidable lens, to 6×, the result will be an exit pupil of 4 mm. diameter and an entrance pupil of about 24 mm. diameter. The viewing prism will therefore have to be adapted to this size. In this manner it becomes possible that with a lesser degree of enlargement or magnification, as already indicated, a luminous binocular observation is established, while with the greater enlargement—i.e. without splitting the beam of light rays—a luminous monocular observation will be obtained.

Corresponding to the entrance pupils and the exit pupils mentioned above the lens system forming said parallel path of light rays may produce an intermediate pupil having a diameter of approximately 120 mm. for the 1.5-fold enlargement and of 34.3 mm. for the 6-fold enlargement. Therefore, in accordance with the invention, two reflectors, for example rhombic prisms for cross-sections of beams of light rays of 60 mm. diameter each, may be arranged within the intermediate pupil. In this manner for the smaller enlargement two beams of light rays of 60 mm. diameter each may be obtained without difficulty which are directed to the separate oculars.

Further, in accordance with the invention, an additional reflection prism whose total light is directed into one of the two subsequently arranged prisms only may be inserted above the two mentioned reflecting prisms which in the periscope are arranged within the said intermediate pupil. The following elements of the periscope system then produce for monocular observation with the greater enlargement an exit pupil having a diameter of 4 mm.

The invention will now be described with reference to the accompanying drawings, in which.

Figure 1:
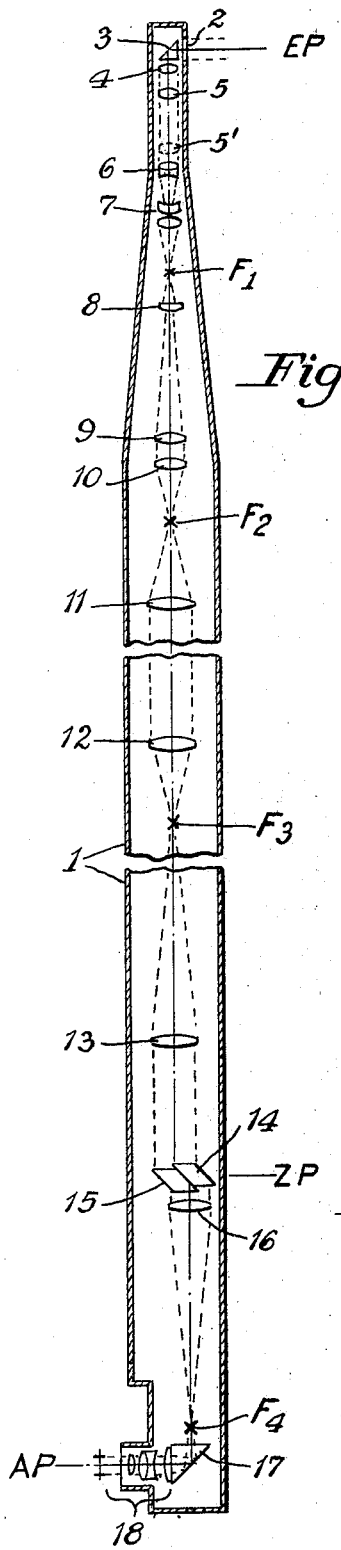
FIG. 1 illustrates a longitudinal sectional view along the axis of the periscope.

Referring to the drawings, FIG. 1 illustrates in a longitudinal axial section the tubular housing 1 of the periscope at the upper end of which is arranged a lateral viewing aperture 2 which directs the light rays coming from a target into a viewing prism 3 arranged in the housing 1 and in rear of the aperture 2. EP indicates the position of the entrance pupil.

The tubular housing 1 has mounted therein a single objective consisting of a number of lenses 4 to 13 inclusive and 16. The focal points of the same and the positions of the intermediate picture planes are designated with $F_1$, $F_2$, $F_3$ and $F_4$. The lens 5 is axially adjustable and may be moved from the illustrated position shown in solid lines to the one indicated in dash lines 5'. Such a displacement has the result that the enlargement of the telescopic arrangement is changed from 1.5× to 6×. The lenses 16, 18 and 16', 18' (FIG. 8) each produce a fixed enlargement of 8.57×. In front of the two oculars 18 and 18' are arranged the two deflecting prisms 17 and 17' respectively. Within the range of the intermediate pupil ZP, located in the parallel path of the light rays between the lenses 13 and 16 two rhombic prism pairs 14, 15 and 14', 15' are positioned. In FIG. 1 only one prism pair 14, 15 is shown. These rhombic prism pairs split the beam of light which enters the aperture 2 and is deflected downwardly into two separate partial beams and these partial beams are directed into the two oculars 18 and 18' respectively.

Figure 2:
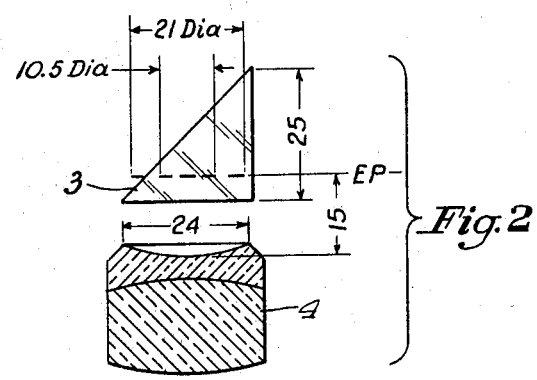
FIG. 2 illustrates in a side elevation view the viewing prism and the objective of the first telescopic system in the upper end of the periscope housing.

. In FIG. 2 is shown in an enlarged scale the viewing prism 3, the objective 4 of the first telescopic system and the entrance pupil EP.

Figure 3:
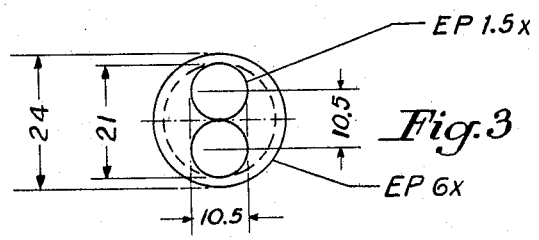
FIG. 3 illustrates a top view of the entrance pupil at enlargements of 1.5× and 6× respectively.

FIG. 3 illustrates in a top view the entrance pupil at an enlargement of 1.5× and the entrance pupil at an enlargement 6×. For an enlargement adjusted to 1.5× the entrance pupil encloses two circles which touch one another as shown in solid lines, each circle may have for instance a diameter of 10.5 mm. These two circles correspond to two exit pupils $AP_L$ and $AP_R$ (FIG. 7), each having a diameter of 7.00 mm. When the enlargement is adjusted to 6× an entrance pupil having a diameter of 24 mm. is produced and the latter furnishes an exit pupil AP having a diameter of 4.00 mm. (FIG. 8). The position of the top view of FIG. 3 corresponds to the line EP in FIG. 2.

Figure 4:
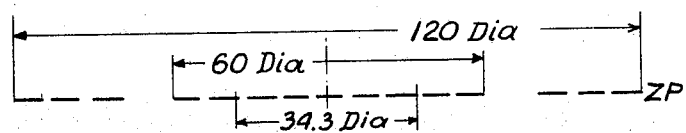
FIG. 4 illustrates in a side elevation view the intermediate pupils at enlargements of 1.5× and 6× respectively.
Figure 5:
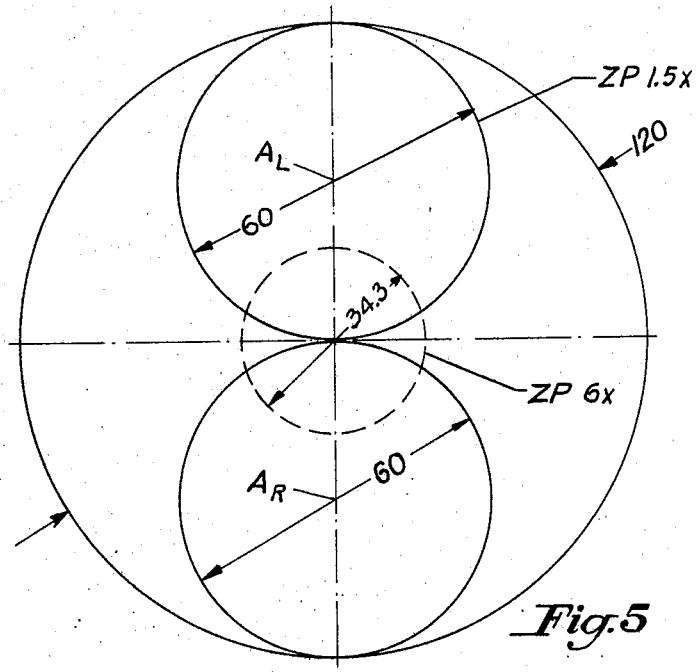
FIG. 5 illustrates in a top elevation view the intermediate pupils shown in FIG. 4.

The FIGS. 4 and 5 illustrate the intermediate pupils for the enlargement 1.5× and 6× respectively. Since, as already mentioned, the lenses 16 and 18 in FIG. 1, which are arranged between the intermediate pupil ZP and the exit pupil AP produces a fixed enlargement of 8.572×, then the 1.5× enlargement with an exit pupil of 7.00 mm. produces for this telescopic system an entrance aperture of 60 mm. while for an enlargement of 6× and an exit pupil of 4.00 mm. an entrance aperture of 34.30 mm. is obtained.

Figure 6:
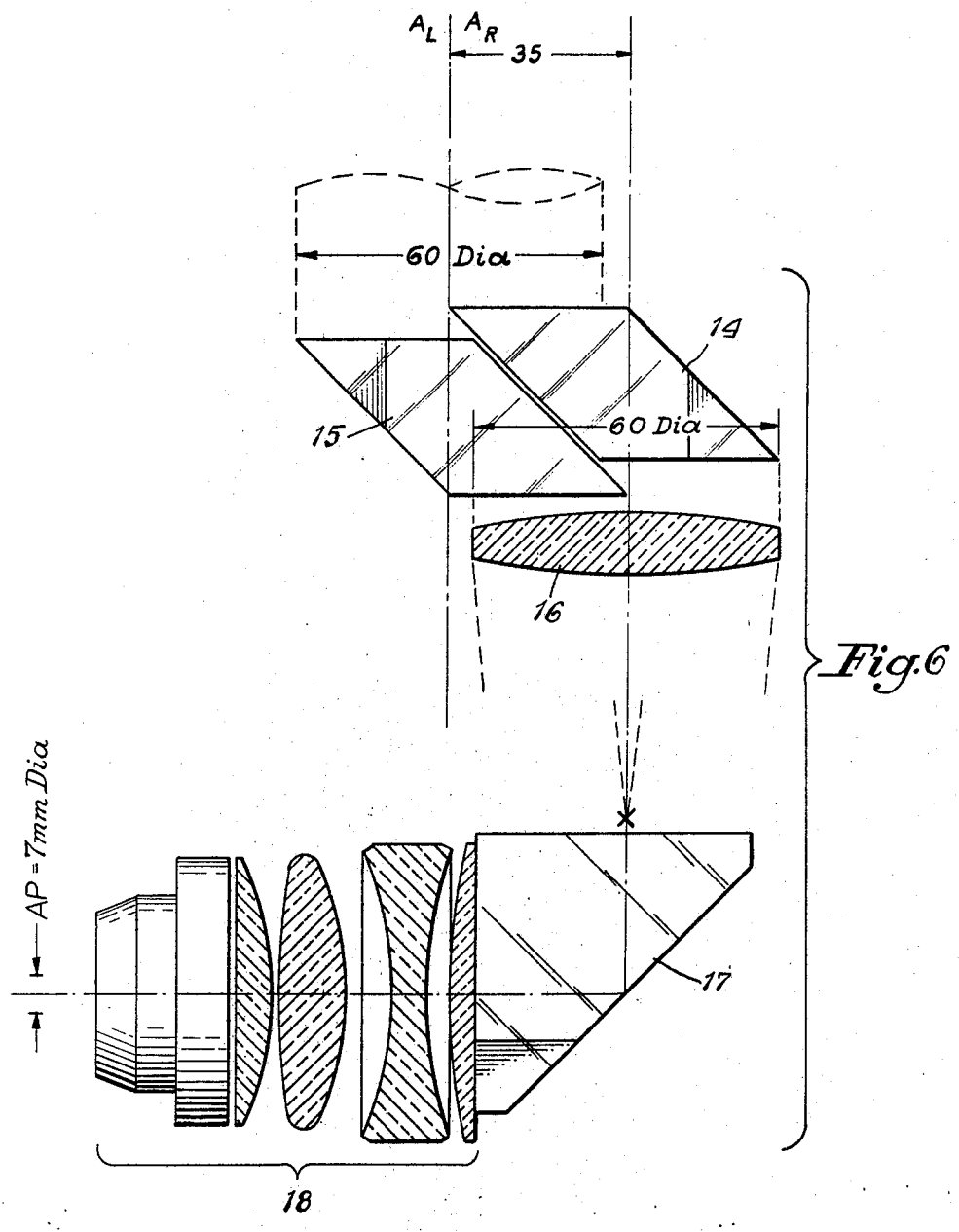
FIG. 6 illustrates in a side elevation view the optical elements in the lower portion of the periscope at an enlarge of 1.5×.
Figure 7:
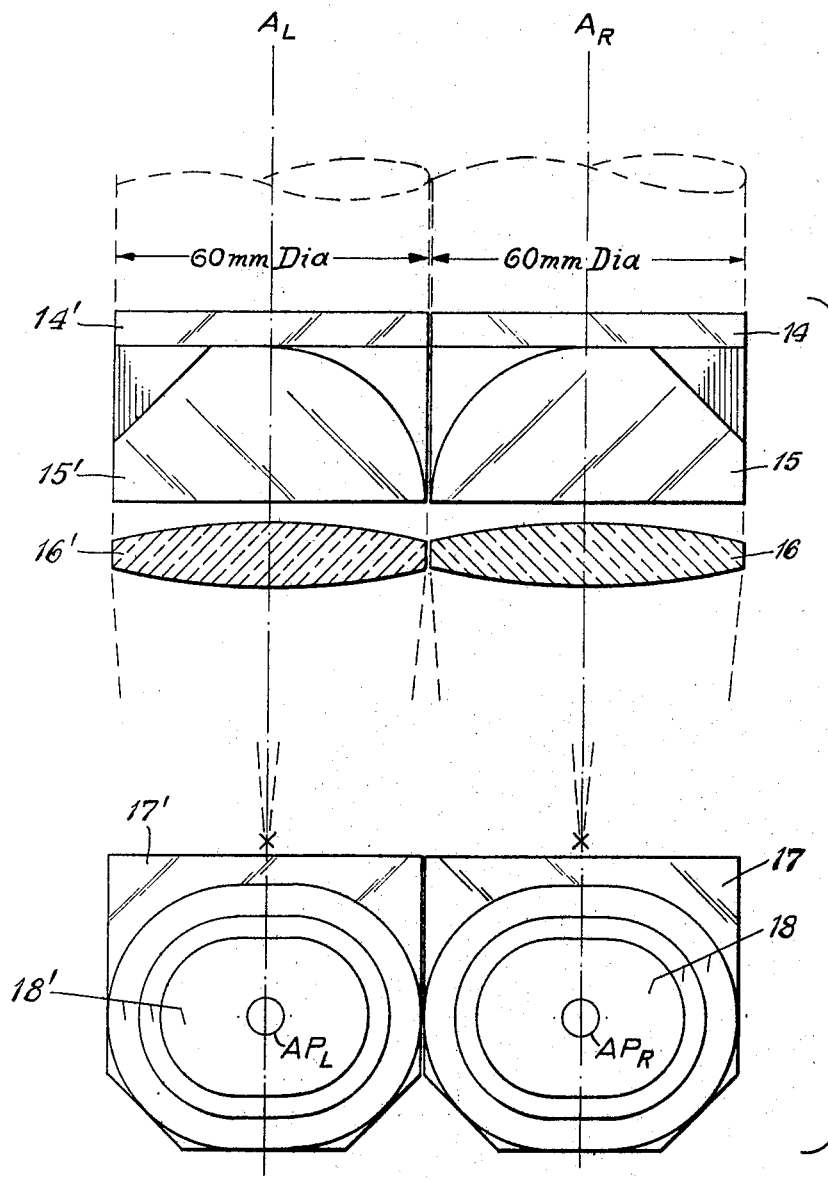
FIG. 7 is a view taken at a right angle of FIG. 6.
Figure 8:
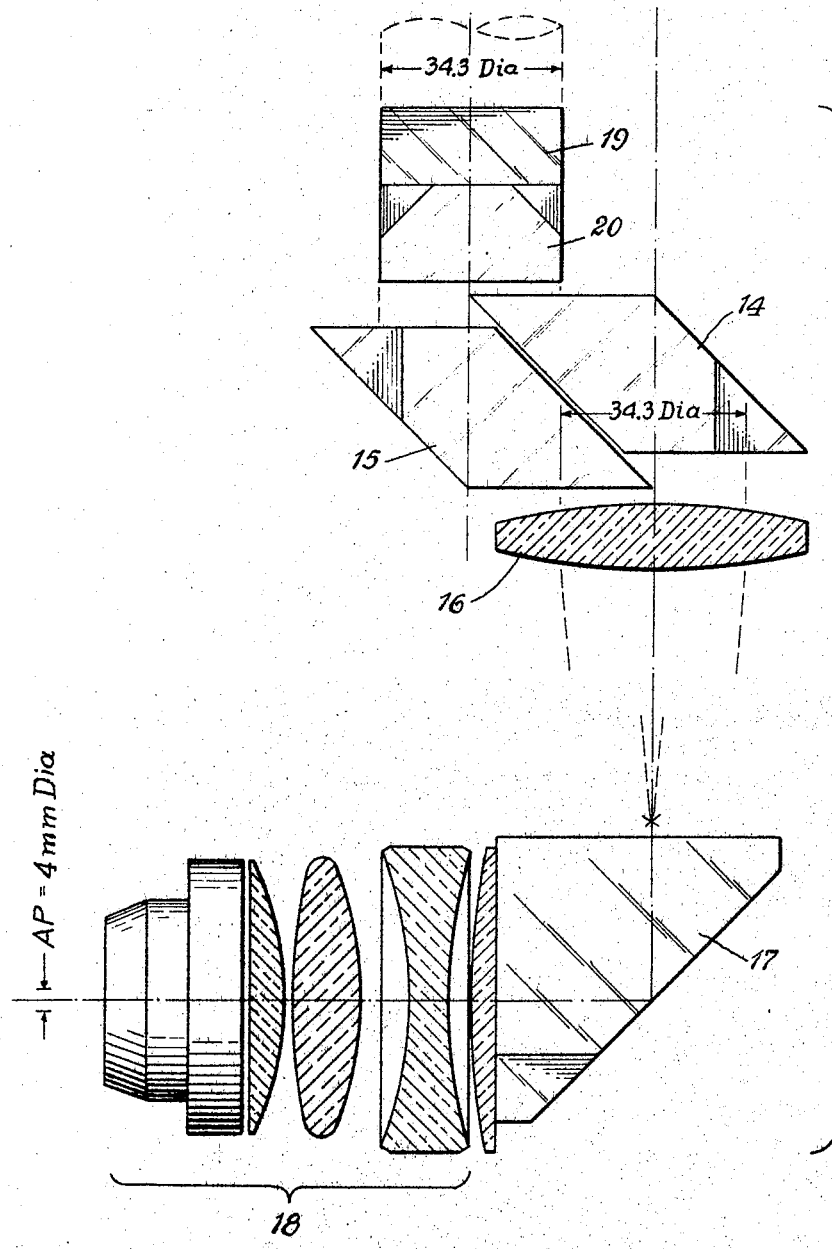
FIG. 8 illustrates in a side elevation view the optical elements in the lower portion of the periscope at an enlargement of 6×.

The FIGS. 6 and 7 illustrate the two rhombic prism pairs 14, 15 and 14′, 15′ which are arranged in the intermediate pupil (ZP in FIG. 1). One pair of these rhombic prisms is provided for each path of light rays of 60 mm. diameter at an enlargement of 1.5×. This permits a parallel displacement of the ray path of, for instance, 35 mm. Each pair of these double prisms 14,15 and 14′, 15′ respectively, is rotatably arranged about the axis $A_L$ and $A_R$ respectively. This permits a variation of distance between the axes of the light beams, which pass through the intermediate pupil ZP, in the amount of 60 to 70 mm. when the light beams have a diameter of 60 mm. By means of a corresponding slidable parallel displacement of the lens systems 16, 18 and 16′, 18′ respectively, the eye distance between the oculars may be adjusted between the values of 60 and 70 mm. With these two rhombic prism pairs arrangement a binocular observation is obtained at an enlargement of 1.5×.

Figure 9:
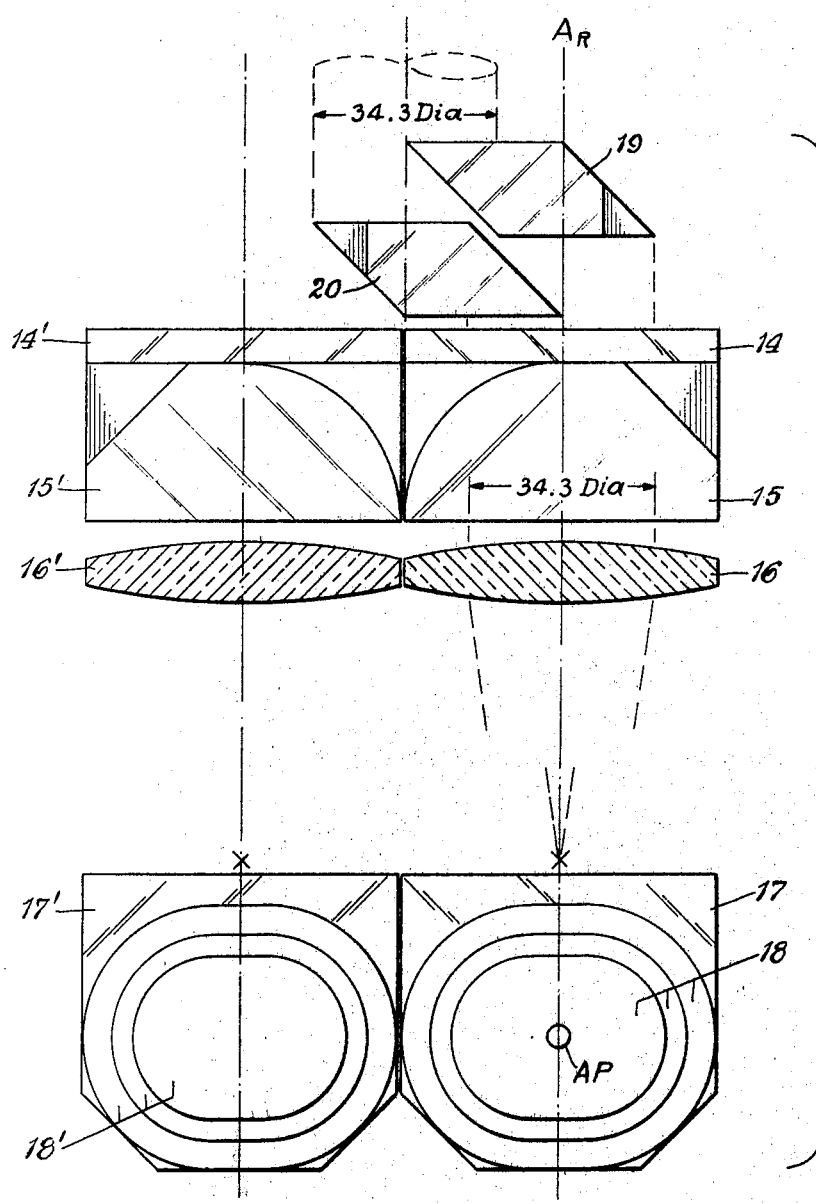
FIG. 9 is a view taken at a right angle of FIG. 8.

At the adjustment to an enlargement of 6×, as illustrated in the FIGS. 8 and 9, an additional rhombic double prism 19, 20 is arranged above the rhombic double prism 14, 15. When the latter has, for example, a free aperture of 60 mm. diameter, then the rhombic double prism 19, 20 will have an aperture of 34.3 in diameter. In the illustrated example the light rays are solely directed into the right hand ocular 18. The rhombic double prism 19, 20 is only then moved into the path of the light rays when the enlargement is adjusted to 6×. On the other hand, the double prism 19, 20 is moved away from the path of the light rays when the enlargement is adjusted to 1.5×.

What I claim is:

1. In a periscope for submarines, provided with a viewing prism, a single objective and two oculars and having an intermediate pupil in the space of the parallel path of light rays between said objective and said ocular means, the improvement comprising the arrangement of two reflector systems within said intermediate pupil for dividing up the beam of light rays entering through said viewing prism into two equal separate partial light beams which are directed to said two separate oculars for binocular observation, an enlargement changer for producing a greater degree of enlargement, and an additional removable reflector means above said two reflector systems, said additional reflector means directing the entire beam of light rays into one of the two reflector systems for monocular observation.

2. In a periscope according to claim 1, in which said two reflector systems comprise two rhombohedral prisms within said intermediate pupil.

3. A periscope according to claim 1, in which said viewing prism has an entrance pupil of about 24 mm. in diameter.

4. A periscope according to claim 1, in which the enlargement for binocular observation is relatively small in the order of about 1.5× and the exit pupil is about 7 mm. in diameter, while the greater enlargement is about 6×, and the exit pupil is about 4 mm. in diameter for monocular observation.

References Cited

UNITED STATES PATENTS

| | | | |
|---|---|---|---|
| 3,155,832 | 11/1964 | Bouwers | 88—72 X |
| 3,195,404 | 6/1965 | Bouwers | 88—72 X |

VERLIN R. PENDEGRASS, Primary Examiner

U.S. Cl. X.R.

350—34, 52